United States Patent
Garai et al.

(10) Patent No.: US 9,972,143 B1
(45) Date of Patent: May 15, 2018

(54) SYSTEMS AND METHODS FOR TREND MONITORING AND EVENT PREDICTION

(71) Applicant: HONEYWELL INTERNATIONAL INC., Morris Plains, NJ (US)

(72) Inventors: Tanushree Maiti Garai, Karnataka (IN); Satish Narayan Hegde, Karnataka (IN); Dhanapal Thirumalaisamy, Karnataka (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days. days.

(21) Appl. No.: 15/447,403

(22) Filed: Mar. 2, 2017

(51) Int. Cl.
  *G07C 5/12* (2006.01)
  *B64F 5/60* (2017.01)
  *G07C 5/08* (2006.01)
  *B64D 45/00* (2006.01)

(52) U.S. Cl.
  CPC ............ *G07C 5/0808* (2013.01); *B64D 45/00* (2013.01); *B64F 5/60* (2017.01); *G07C 5/085* (2013.01); *G07C 5/12* (2013.01)

(58) Field of Classification Search
  CPC ........ G07C 5/0808; G07C 5/12; G07C 5/085; G64F 5/60; B64D 45/00
  USPC ...................................................... 701/3, 32
  See application file for complete search history.

(56) References Cited

U.S. PATENT DOCUMENTS

| | | | |
|---|---|---|---|
| 6,408,259 B1 * | 6/2002 | Goebel | B64D 43/00 701/100 |
| 7,979,192 B2 | 7/2011 | Morrison et al. | |
| 9,233,763 B1 | 1/2016 | Chen | |
| 2009/0312897 A1 | 12/2009 | Jamrosz et al. | |
| 2013/0138632 A1 * | 5/2013 | Yost | G06Q 10/06 707/722 |
| 2016/0105326 A1 * | 4/2016 | Smart | H04L 41/0873 370/242 |
| 2016/0340058 A1 * | 11/2016 | Da Silva | B64D 45/00 |

FOREIGN PATENT DOCUMENTS

EP 3843244 A1 11/1997
WO 2002053405 A2 7/2002

* cited by examiner

*Primary Examiner* — Tan Q Nguyen
(74) *Attorney, Agent, or Firm* — Lorenz & Kopf, LLP

(57) ABSTRACT

A system and method are provided that are directed to the technological problem of performing real-time trend analysis to provide real-time cockpit level event predictions. The provided systems and methods further provide real-time corrective action suggestions associated with the real-time trend analysis.

20 Claims, 8 Drawing Sheets

SYSTEMS AND METHODS FOR TREND MONITORING AND EVENT PREDICTION

TECHNICAL FIELD

The technical field generally relates to notification systems, and more particularly relates to systems and related operating methods for trend monitoring, event prediction, and suggesting corrective action for mobile platforms.

BACKGROUND

State of the art aircraft generate a vast quantity of data. Some failure analysis systems monitor individual components and record component level data for post flight analysis. Often, the component level data is transferred, post flight, from the aircraft to a ground station for review and analysis. Additionally, the review and analysis is often aimed at component level, or subsystem-level (i.e., the engine, or the speed brakes), failure analysis. Information produced by this type of analysis is useful for fleet analysis and scheduling maintenance; however, it may not be suitable for real-time operational use.

In a variety of operational scenarios, cockpit level events, such as a postulated loss of autopilot, manifest quickly, and require a pilot or crew to view multiple display devices to ascertain a probable cause and respond accordingly. The above described trend analysis approaches do not address these real-time cockpit level events. This dearth of real-time cockpit event level feedback presents a technological limitation or problem that can lead to a high cognitive workload for the pilot.

Accordingly, systems and methods directed to the technological problem of performing real-time trend analysis to provide real-time cockpit level event predictions are desirable. The desirable systems and methods further provide real-time corrective action suggestions associated with the real-time trend analysis. The following disclosure provides a technological solution to this technological problem, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system for trend monitoring in an aircraft is provided. The system comprises: a memory device; a display device; and a processor coupled to the memory device, a source of critical parameters, and the display device, the processor configured to: initialize, for a critical parameter, a first threshold (t1), and a first alert table (a1), wherein a1 comprises, for t1, a list of probable causes associated with exceedance of t1, a respective list of corrective actions, and a communication protocol for the display device; receive, at a first time, for the critical parameter, a valid first actual data, and a valid first predicted data; determine a first current deviation defined as a difference between the first valid actual data and the first valid predicted data; assert a flag upon determining that first current deviation exceeds t1; determine a content and format for an alert based on the asserted flag and the critical parameter; identify a probable cause and corrective action associated with the alert in response to referencing a1; and command the display device to render the alert, probable cause, and the corrective action, in accordance with a1.

A trend monitoring module for an aircraft is provided. The module comprises: a computer readable storage medium; and a processor coupled to the storage medium, the processor configured to: initialize, for a critical parameter, a first threshold (t1), a second threshold (t2), and a first alert table (a1), wherein a1 comprises, for t1 and t2, a list of probable causes associated with exceedance of t1 and respective corrective actions, and a list of probable causes associated with exceedance of t2 and respective corrective actions; (a) receive from a source of critical parameters, at a first time, for the critical parameter, a valid first actual data, and a valid first predicted data; (b) determine the first current deviation defined by the first valid actual data minus the first valid predicted data; (c) transfer contents of a current data location to a previous data location in the storage medium, the previous data location comprising a previous actual data, a previous predicted data, a previous time, and a previous deviation; (d) store, in the current data location, the first valid actual data, the first valid predicted data, the first time as current time, and the first current deviation; and determine a delta time (delta_t) defined by the current time minus the previous time, determine a delta deviation (delta_dev) defined by the current deviation minus the previous deviation, if the delta_dev is positive, generate an above threshold alert, and if delta_dev/delta_t is greater than t1, generate an alert including a probable cause and corrective action, in accordance with a1, if the delta_dev is negative, generate a below threshold alert, and if delta_dev/delta_t is greater than t2, generate an alert including a probable cause and corrective action, in accordance with a1; and (e) repeat (a)-(d).

A method for trend monitoring in an aircraft is provided. The method comprises: initializing in a memory device, for a critical parameter, a first threshold (t1), and a first alert table (a1), wherein a1 comprises, for t1, a list of probable causes associated with exceedance of t1, a respective list of corrective actions, and a communication protocol for a display device; receiving from a source of critical parameters, at a first time, for the critical parameter, a valid first actual data, and a valid first predicted data; determining a first current deviation defined as a difference between the first actual data and the first predicted data; asserting a flag upon determining that first current deviation exceeds t1; referencing a1 to determine a content and format for an alert based on the asserted flag and the critical parameter; and identifying a probable cause and corrective action associated with the alert in response to referencing a1.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided trend monitoring system and method may take the form of a trend module (FIG. 1, 104), and may be separate from, or integrated within, a preexisting mobile platform management system or aircraft flight management system (FMS).

A dearth of real-time cockpit level event (shortened herein to cockpit event, or event) monitoring and real-time corrective action is a technological problem solved by the trend module 104. The trend module 104 employs a non-conventional technological solution to this technological problem by providing real-time cockpit event monitoring. In performing the real-time cockpit event monitoring, the trend module 104 culls and transforms received critical parameter data, and provides real-time corrective action suggestions responsive thereto. The below description provides more detail as to these functions.

Figure 1:
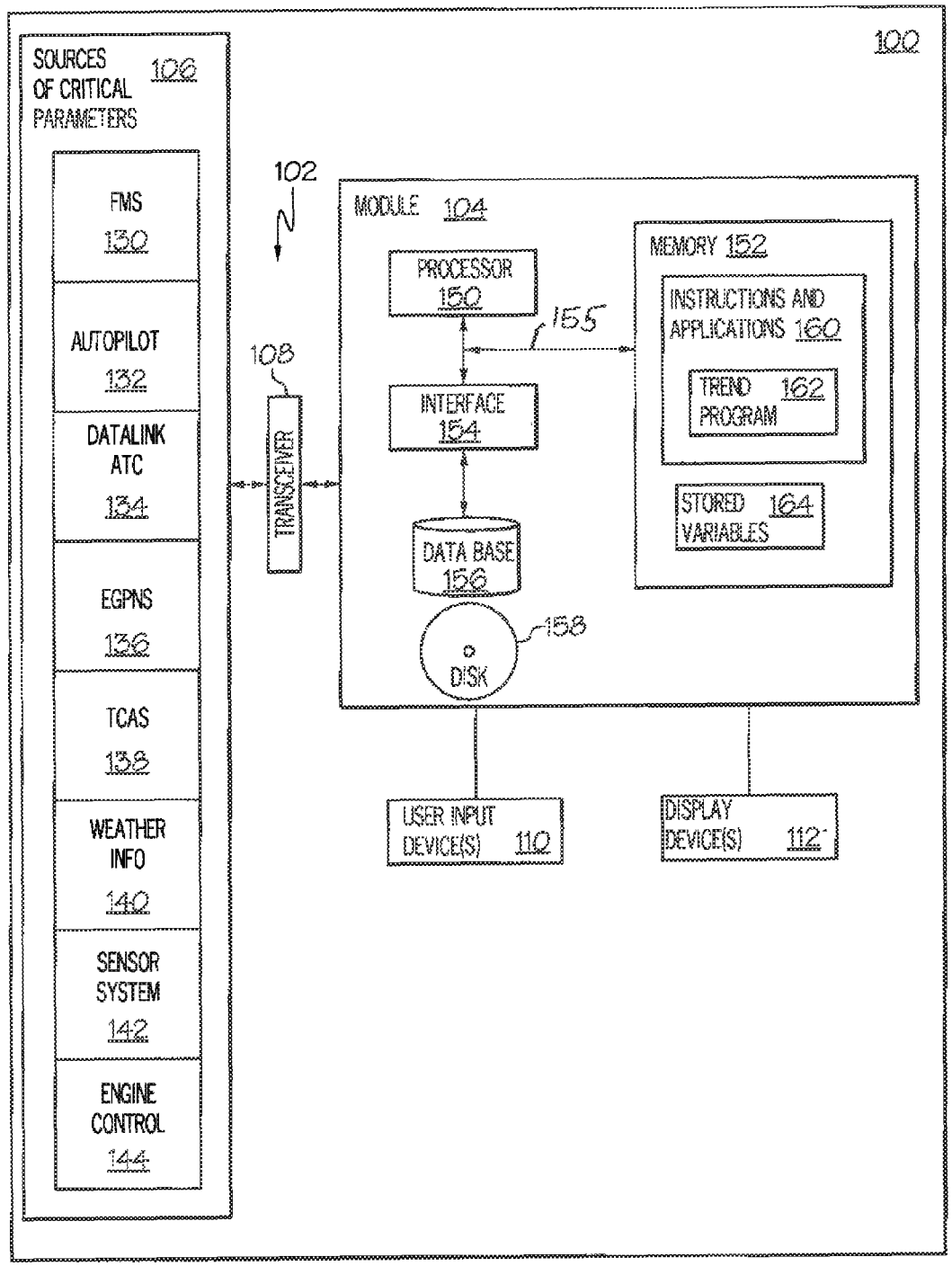
FIG. 1 is a functional block diagram illustrating a trend monitoring system, in accordance with various exemplary embodiments.

Turning now to FIG. 1, a functional block diagram of a trend monitoring system 102 is depicted, in accordance with various exemplary embodiments. Although the depicted embodiment realizes the trend monitoring system 102 within an aircraft 100, the concepts presented here can be deployed in a variety of mobile and non-mobile platforms, such as vehicles, spacecraft, watercraft, buildings, open-air spaces, and the like.

In the depicted embodiment, the trend monitoring system 102 includes: a trend module 104 that receives critical parameters from a plurality of cockpit level sources 106 of critical parameters, via transceiver 108. The sources 106 of critical parameters provide the data (i.e., the critical parameters) to be processed and transformed by the trend module 104. In some embodiments, a same, differently measured, or predicted critical parameter is received from more than one of the sources 106 of critical parameters. The trend module 104 is capable of receiving and processing critical parameters in each of these scenarios. The trend module 104 is electronically coupled to a user input device 110 and one or more display devices 112. The operation of these functional blocks is described in more detail below.

As mentioned, the sources 106 of critical parameters provide "cockpit-level" information, in that they provide information that a pilot reviews and relies upon in the course of operating the aircraft, and the information provided by them is at a higher level of integration than merely component-level or subsystem-level. In the embodiment depicted in FIG. 1, the sources 106 of critical parameters include a flight management system (FMS) 130, an autopilot system 132, a datalink and air traffic control (ATC) system 134, an electronic ground proximity warning system (EGPWS) 136, a traffic collision and avoidance system (TCAS) 138, a weather information system 140, a sensor system 142, and other engine controls 144. In other embodiments, particularly those that are not avionics-related, additional sources of critical parameters may be added, and some of the above listed sources may be deleted.

Critical parameters provided by the FMS 130 may be related to: a flight plan, including intermediate waypoints; flight information (Airspeed, Ground Speed, Wind Speed, Wind Direction, Altitude, Latitude, Longitude, Outside Air Temperature, Time to Destination, Distance to Destination, GMT, Estimated Time of Arrival, etc.); and Aircraft Navigation & Guidance information (pitch and yaw data, roll data). Accordingly, critical parameters received from the FMS may include predicted critical parameters. Critical parameters provided by sensors in the sensor system 142 are generally related to components and subsystems of the aircraft 100. Generally, each sensor of the sensor system 142 is specifically coupled to a respective component or subsystem of the aircraft 100 and configured to sense or detect a specific aspect of the respective component or subsystem. The sensor system 142 converts sensed (detected) information into electronic critical parameter data for use cockpit level subsystems (such as the FMS 130), and the data will also be used by the trend module 104.

Examples of subsystems and components that the sensors in sensor system 142 may be coupled to include spoilers, speed brakes, engine temperature, cabin temperature, cabin pressure, and the like. Accordingly, in various embodiments, the sensor critical parameters provided include: electrical, pressure, and/or mechanical connection of the components and subsystems, temperature, vibration, and velocity. As a non-limiting example, the critical parameters provided to the trend module 104 from the sensor system 142 may include velocity and acceleration information, wheel rotation, breaking gravitational (G) force, inclines and declines during travel, pressure on a gas pedal and a brake, gear status, external temperature, battery status information, sensed cabin temperature.

In addition to the sensors that sense subsystems and components, the sensor system 142 may also include sensors, devices, instruments (such as Radar, Lidar, and a Global Positioning System (GPS)), and software, for providing an aircraft position, location, and orientation, in addition to detecting weather, and providing a predicted position, location, orientation, etc., with respect to an aircraft and its flight path, for weather events such as turbulence, to the trend module 104. As mentioned above, the above described sensors may be part of various other cockpit-level sources of information, such as the weather information system 140, or work in conjunction with them.

Critical parameters provided by various other sources 106, such as, the autopilot system 132, the datalink and air traffic control (ATC) system 134, the electronic flight bag (EFB)/electronic ground proximity warning system (EG-PWS) 136, the traffic collision and avoidance system (TCAS) 138, the weather information system 140, and the other system and engine controls 144 are as conventionally known to persons of skill in the art. The trend module 104 transforms the critical parameter data into cockpit events and operates thereon, as described below. Examples of cockpit events are provided in connection with FIGS. 4-8.

The critical parameter is received as data, therefore, it is here forth referred to as "critical parameter data." Regardless of the source 106 of a received critical parameter data, the critical parameter data is understood to have a time component that demarks the time at which the critical parameter data was obtained, and it is also understood to have passed validity testing (i.e., be deemed valid data) prior to reaching the trend monitoring system 102. As may be readily appreciated, the trend monitoring system 102 continually receives the valid critical parameter data, which, at any given time, may be from any combination of the variety of sources 106 of critical parameters. Further, for each received critical parameter data, there is assumed to be not only the received valid actual data, but also a received valid predicted data. Together, the actual and predicted data, at any given time, enable the trend monitoring system 102 to transform and employ the received critical parameter data further, as described in more detail below.

As depicted in FIG. 1, the display device(s) 112 may be implemented using any one of numerous known display devices suitable for rendering textual, graphic, and/or iconic information in a format viewable by a user. The display devices may provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology. The various display device(s) 112 may each, individually, be responsive to user input via user input device(s) 110 and/or be under the control of the trend module 104.

In various embodiments, the user input device 110 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. Non-limiting examples of uses for the user input device 110 include: entering values for stored variables 164, loading or updating instructions and applications 160, and loading and updating the contents of the database 156, each described in more detail below.

The transceiver 108 may include at least one receiver and at least one transmitter that are operatively coupled to the trend module 104. The transceiver 108 can enable the trend module 104 to establish and maintain the communications links to onboard components (not shown), and the sources 106 of critical parameters. The transceiver 108 can support wired and a variety of types of wireless communication, and can perform signal processing (e.g., digitizing, data encoding, modulation, etc.) as is known in the art. In some embodiments, the transceiver 108 is integrated with the trend module 104.

The trend module 104 performs the functions of the trend monitoring system 102. With continued reference to FIG. 1, within the trend module 104, the processor 150 and the memory 152 form a trend monitoring and event prediction engine that performs the processing activities. The trend monitoring and event prediction engine provides a technological improvement to the display of information, in part, by performing the real time trend analysis and referencing the database 156 responsive thereto.

The trend module 104 continuously performs trend analysis on a per critical parameter basis, i.e., trend analysis on each critical parameter data of a plurality of received critical parameter data. When a critical parameter's received actual critical parameter data has exceeded its current predicted critical parameter value by a predefined threshold, the trend module 104 asserts a flag associated with that critical parameter. The asserted flag is used to reference a lookup table in database 156. The trend module 104 matches the flag in the database to determine an alert (for example, a1) associated with the respective flag. As mentioned, the results of the trend analysis, on a per critical parameter basis, are then integrated into predefined cockpit events, and the appropriate alert is determined when the cockpit event requirements stored within the database 156, at a1, are met. The subsequently generated alert notifies a user that the event occurred. As may be readily understood, an event is a superset that may stand for the occurrence of a single flag, or may stand for the occurrence of one or more flags in a predefined relationship. In various embodiments, an event can be defined as occurring based on a change in status of a critical parameter in more than one dimension. In a first example, consider the event "change in altitude," the critical parameter is aircraft actual altitude; in which case, the event/alert may represent an occurrence of the aircraft actual altitude minus the aircraft predicted altitude exceeding an upper altitude threshold, or an occurrence of the aircraft actual altitude minus aircraft predicted altitude exceeding a lower altitude threshold.

Once the alert a1 is determined, a1 provides a communication protocol that includes the content, format, and presentation of alert information such that it is suitable for a target display device 112. This communication protocol is part of the alert information stored as a1 in the database 156. Accordingly, a technological challenge addressed by the trend module 104 is the determination, based on the received critical parameter data, of an appropriate alert, not only in terms of event information, but also in terms of content, format, and presentation, of the event information on a target display device 112.

The asserted flag is further used to identify a corrective action for the event/alert. With reference to the above example, the corrective action for each event may vary. In this manner, the trend module 104 realizes real-time monitoring of each critical parameter of the received critical parameters, as well as alerting to the events and suggesting (in real-time) corrective action for the events, based upon determining when critical parameters exceed their threshold. The above described determination and identification is performed in accordance with the trend program 162, as is described in more detail below.

The trend module 104 also includes an interface 154, communicatively coupled to the processor 150 and memory 152 (via a bus 155), database 156, and an optional storage disk 158. In various embodiments, the trend module 104 performs actions and other functions in accordance with steps of the method 200 described in connection with FIG. 2. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

A computer readable storage medium, such as a memory 152, the database 156, or a disk 158 may be utilized as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164.

The database 156 are computer readable storage mediums in the form of any suitable type of storage apparatus, including direct access storage devices such as hard disk drives, flash systems, floppy disk drives and optical disk drives. In one exemplary embodiment, the database 156 stores a lookup table that associates one or more critical parameters with events, stores alert information for each of the events. The stored alert information for each event comprises: alert content, format and presentation, for a variety of display devices 112, as well as corrective actions for each event). Information in the databases 156 may be organized or imported during an initialization step (at 202 of the method 200 in FIG. 2).

The bus 155 serves to transmit programs, data, status and other information or signals between the various components of the trend module 104. The bus 155 can be any suitable physical or logical means of connecting computer systems and components. This includes, but is not limited to, direct hard-wired connections, fiber optics, infrared and wireless bus technologies. During operation, the trend program 162, stored in the memory 152, is loaded and executed by the processor 150.

The interface 154 enables communications within the trend module 104, can include one or more network interfaces to communicate with other systems or components, and can be implemented using any suitable method and apparatus. For example, the interface 154 enables communication from a system driver and/or another computer system. In one embodiment, the interface 154 obtains the various critical parameter data from the sources 106 of critical parameters directly. The interface 154 may also include one or more network interfaces to communicate with technicians, and/or one or more storage interfaces to connect to storage apparatuses, such as the database 156.

During operation, the processor 150 loads and executes one or more programs, algorithms and rules embodied as instructions and applications 160 contained within the memory 152 and, as such, controls the general operation of the trend module 104 as well as the trend monitoring system 102. In executing the process described herein, such as the method 200 of FIG. 2, the processor 150 loads and specifically executes the trend program 162, to thereby realize an unconventional technological improvement to both the cockpit display and the analysis/use of critical parameters. Additionally, the processor 150 is configured to process received inputs (any combination of the user input provided via user input device 110, and critical parameters from one or more of the sources 106 of critical parameters), reference the database 156 in accordance with the trend program 162, and command and control the display devices 112 based thereon.

Figure 2:
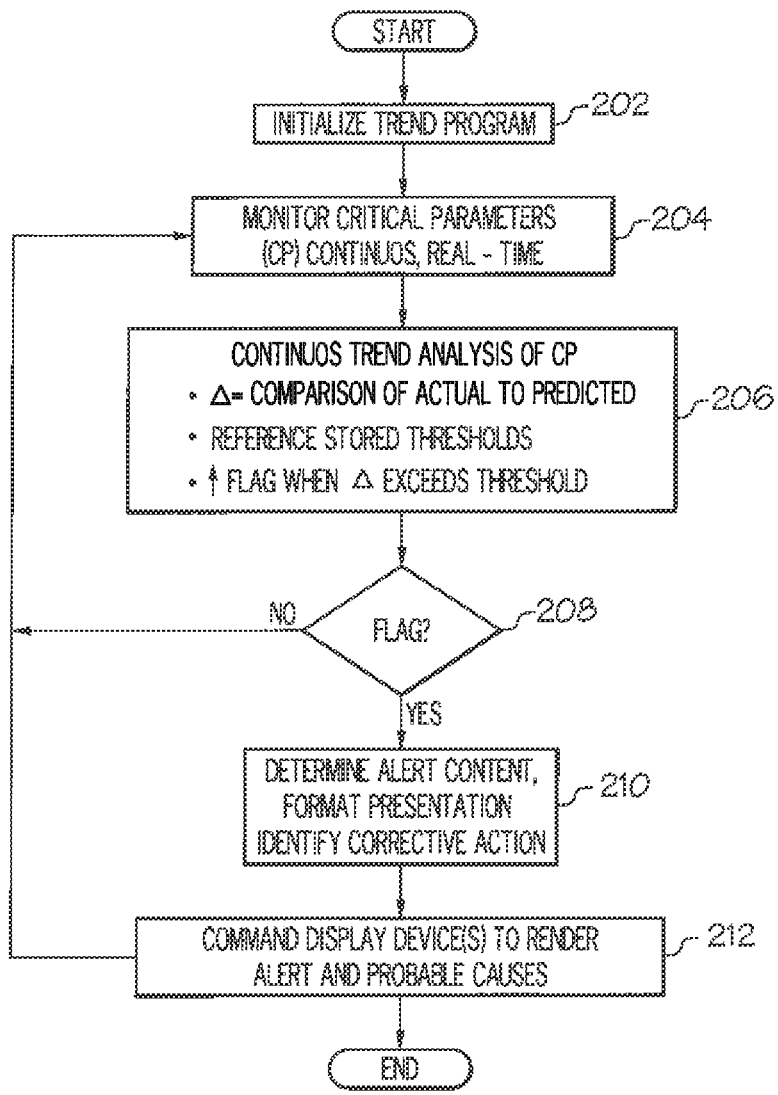
FIG. 2 is a flow chart describing a method for a trend monitoring system, in accordance with various exemplary embodiments.

A method 200 for selective annunciation is provided in connection with FIG. 2. As mentioned, the processor 150 and the trend program 135 form a trend monitoring and event prediction engine that continually, and in real time, (i) monitors the critical parameters (cp), (ii) performs continuous trend analysis of the critical parameter data, and (iii) asserts a flag when a threshold related to the critical parameter is exceeded.

It will be appreciated that trend monitoring system 102 may differ from the embodiment depicted in FIG. 1. As a first example, in various embodiments, the sources 106 of critical parameters can be any system or sub-system supporting a pilot while operating the aircraft 100. In addition, any combination of the user input device 110, the transceiver 108, and the sources 106 of critical parameters can be integrated, for example, as part of an existing FMS 130. Regardless of the state of integration of these systems, a user may control one or more features of the trend monitoring system 102 by providing user input via at least the user input device 110.

Referring now to FIG. 2 and with continued reference to FIG. 1, a flow chart is provided for a method 200 for a trend monitoring system 102, in accordance with various exemplary embodiments. Method 200 represents various embodiments of a method associated with the trend monitoring system 102. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

The method starts, and at 202 the trend module 104 is initialized. As mentioned above, initialization may comprise uploading or updating instructions and applications 160, trend program 162, stored variables 164, and the various lookup tables stored in the database 156. Generally, predetermined variables include, for example, critical parameter threshold values, and time thresholds associated with each threshold (t1, t2) of each critical parameter. In an embodiment, at 202, the method 200 initializes, for each critical parameter of a plurality of critical parameters: a first threshold (t1), a second threshold (t2), and a first alert table (a1), wherein a1 comprises, for t1 and t2, a list of probable causes associated with exceedance of t1 or t2 within a respective time threshold, and respective corrective actions. In some embodiments, a1 includes additional instructions and rules for rendering information differently based on type of display device 112. Initialization also includes (i) resetting to zero, in the database 156, a current data location comprising (a) a current actual data, (b) a current predicted data, (c) a current time, and a (d) current deviation; and, (ii) resetting to zero, in the database 156, a previous data location comprising (a) a previous actual data, (b) a previous predicted data, (c) a previous time, and (d) a previous deviation.

At 204, critical parameters are continuously received. Therefore, at 204, valid first actual data (actual data) and valid first predicted data (predicted data) are received for at least one critical parameter, at a denoted current time ("the first time" in a first pass through the program). In an embodiment, when a plurality of critical parameters is received, it is assumed that the valid first actual data and valid first predicted data are received for each critical parameter of the plurality of critical parameters.

At 206, trend analysis is continuously performed on the critical parameter data. Trend analysis may include, for each critical parameter of a plurality of critical parameters, any of the following operations: (i) generating a first current deviation, defined as the difference between current actual data and current predicted data, (ii) referencing the database 156 for the thresholds (t1, t2) associated with the critical parameter data, and the associated time thresholds, (iv) asserting a flag when the first current deviation exceeds a predetermined threshold (i.e., t1 or t2), (v) transferring contents of the current data location to the previous data location, (vi) storing, in the current data location, the first actual data, the first predicated data, the first time as current time, and the first current deviation, and (v) transferring contents of a current data location to a previous data location, for continued looping of the trend analysis.

At 208, if a flag is asserted, the method 200 moves to 210 to determine what kind of alert to generate, by on referencing database 156, based on the critical parameter associated with the asserted flag. At 208, if no flag is asserted, the method returns to monitoring the critical parameters at 204.

At 210, when the flag is asserted, the method 200 determines, inter alia, whether the asserted flag alone supports an event alert, or whether the asserted flag should be analyzed in conjunction with other critical parameters to support an event alert. At 210, any probable cause and corrective action is also identified, based on referencing the database 156 for the a1 associated with the critical parameter. For example, for an event of exceeding the predicted altitude: at 210, when the contents of the previous data location are non-zero, the method 200 determines a delta time (delta_t), defined by the current time minus the previous time, and determines a delta deviation (delta_dev), defined by the current deviation minus the previous deviation When the delta_dev is positive, the method 200 determines that an above threshold alert is required, and when the delta_dev/delta_t is greater than t1, the method further determines that an alert including a probable cause and corrective action, in accordance with a1 is required. Likewise, when the delta_dev is negative, the method 200 determines that a below threshold alert is required, and when delta_dev/delta_t is greater than t2, the method 200 determines that an alert including a probable cause and corrective action, also in accordance with a1, is required. At 212, the method commands one or more of the display device(s) 112 to render the determined alert and identified corrective action from 210. Depending upon the application, after completion of 212 the method may return to 204 for continued receipt of critical parameters, or end. In subsequent passes through the program or method, asserted flags may be deasserted and generated alerts may be ceased, depending upon the trend analysis results of each pass through the program.

Figure 3:
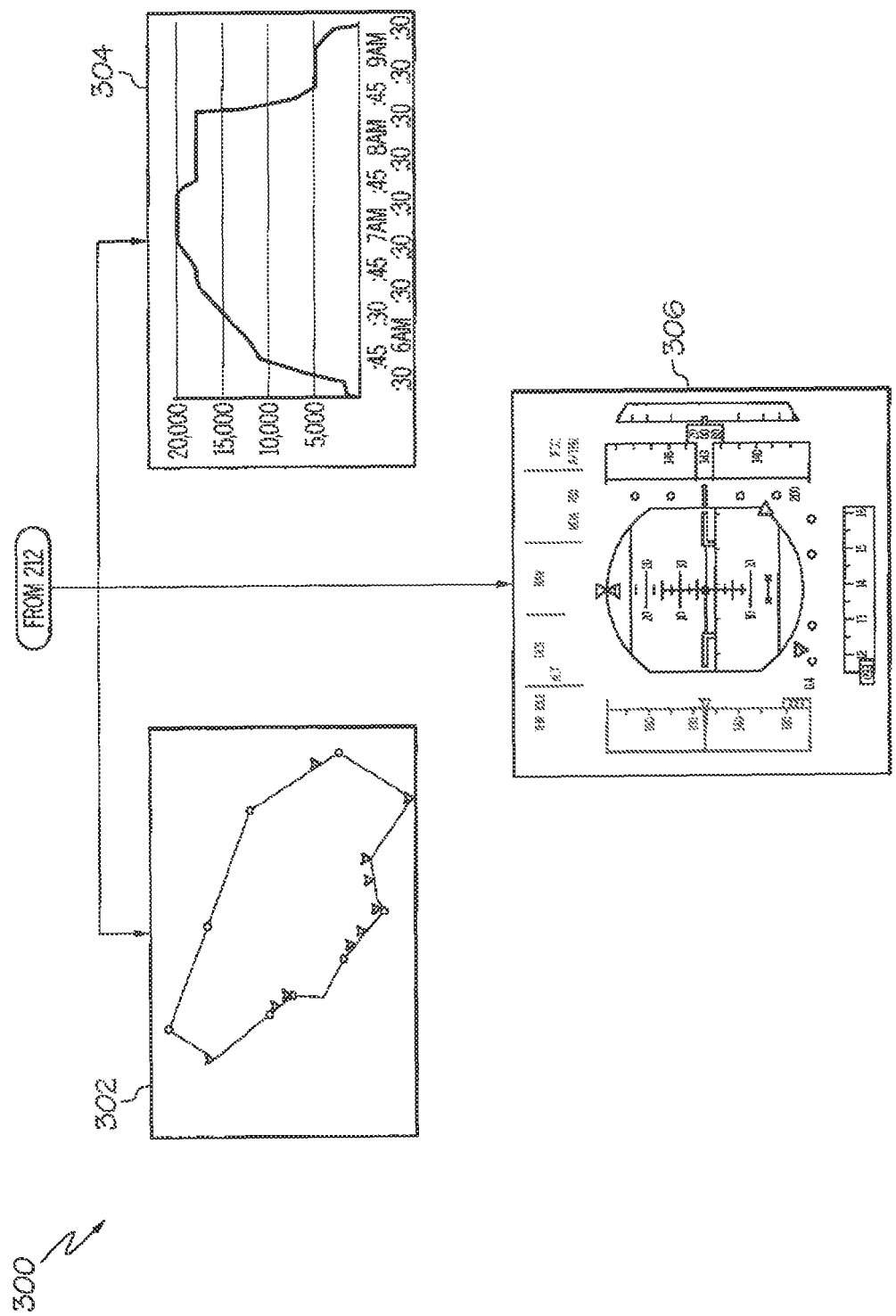
FIG. 3 is an illustration of some of the display formats supported by various exemplary embodiments.

FIG. 3 is an illustration 300 of some of the display formats supported by various exemplary embodiments. Commands from the method at 212 may control a display device 112 that supports lateral profiles 302, a display device 112 that supports vertical profiles 304, or a display device 112 that supports a primary flight display 306. FIGS. 4-8 show cockpit level events and provide examples of how the trend program 162 in the trend module 104 creates an improved presentation of information by the display device(s) 112.

Figure 4:
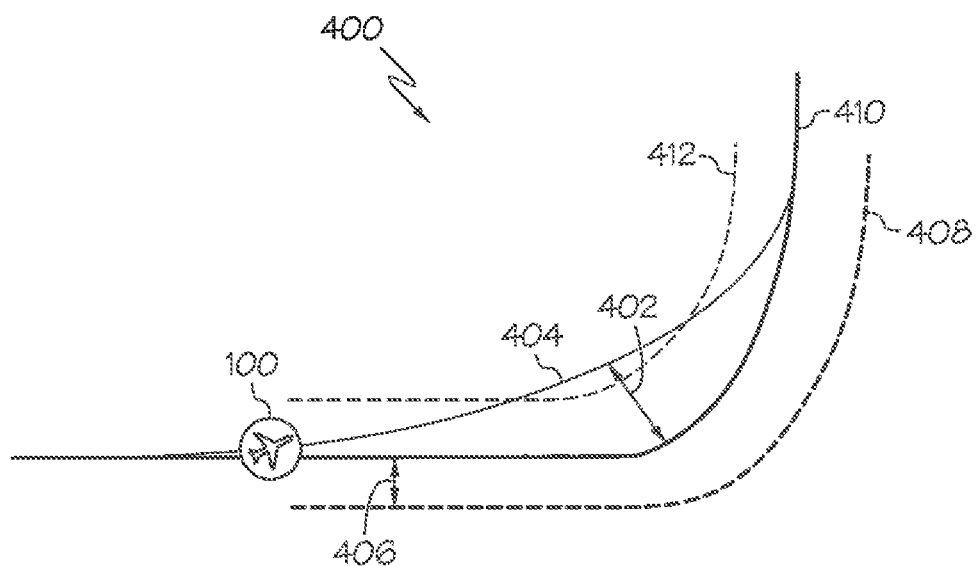
FIG. 4 is a two-dimensional image of an alert to a predicted lateral path deviation, in accordance with various exemplary embodiments.
Figure 5:
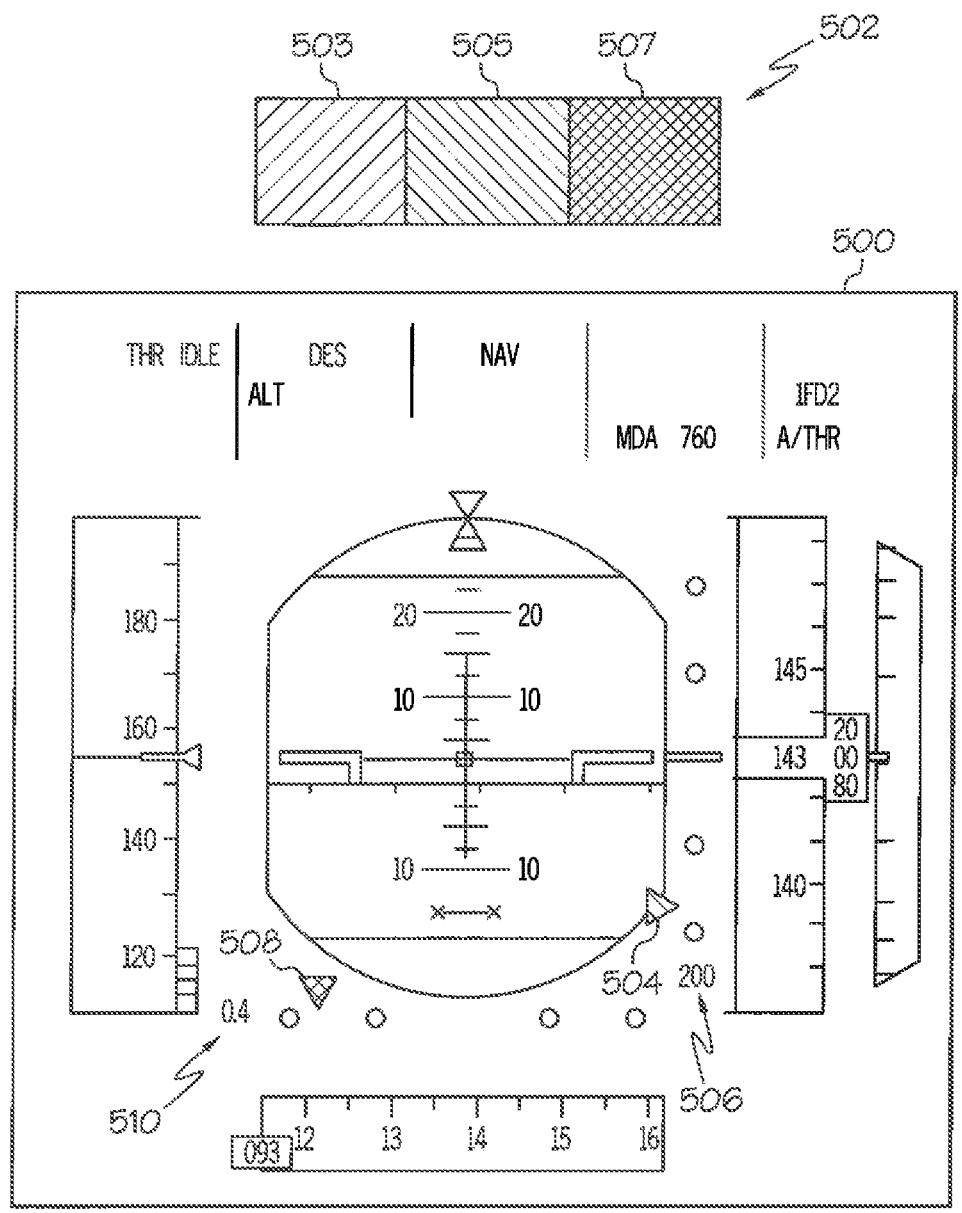
FIG. 5 is a primary flight display image with an alert to a predicted lateral and vertical path deviation, in accordance with various exemplary embodiments.

An example of a cockpit event called an infringement of a required navigation performance (RNP) corridor is shown in the image 400 of FIG. 4. Aircraft 100 is shown on a predicted flight path 404 that has a predicted maximum deviation from a centerline 410 by 0.4 nautical miles (402). The allowed margin for lateral deviation is depicted as dashed lines (408, 412) separated by 0.3 nautical miles (406) on each side of the desired lateral navigation (LNAV) centerline 410. Therefore, in this example, the threshold t1 is 0.3 nautical miles. By processing the critical parameter data, the trend module 104 predicts that the aircraft 100 will infringe on the RNP corridor in the near future, if no further action is taken. In FIG. 4, the visual symbology that is rendered may indicate the lateral deviation in a first, alert, color, such as red. In FIG. 5, when the display device 112 is a PFD display, the PFD display supports rendering image 500 depicting both the lateral deviation of FIG. 4, and a vertical component of RNP deviation.

The FIG. 5 primary flight display (PFD) image 500 comprises an alert to two cockpit events, a predicted lateral path deviation, and a predicted vertical path deviation, in accordance with various exemplary embodiments. A color coding bar 502, presently depicted in a grey scale, is used to visually distinguish a continuum from normal actual positions 503 to cautionary deviations 505 to maximum alert deviations 507. On the PFD, a symbol 504 is rendered in a first color (such as yellow) to distinguish a cautionary vertical deviation that will not exceed a threshold of 250 feet. At 506, the maximum value is presented as alphanumeric "200." Providing similar information to the LNAV image of FIG. 4, Symbol 508 is rendered in a second color (such as red) to distinguish a maximum alert lateral deviation 0.4 nautical miles that exceeds the 0.3 nautical miles allowable deviation.

Figure 6:
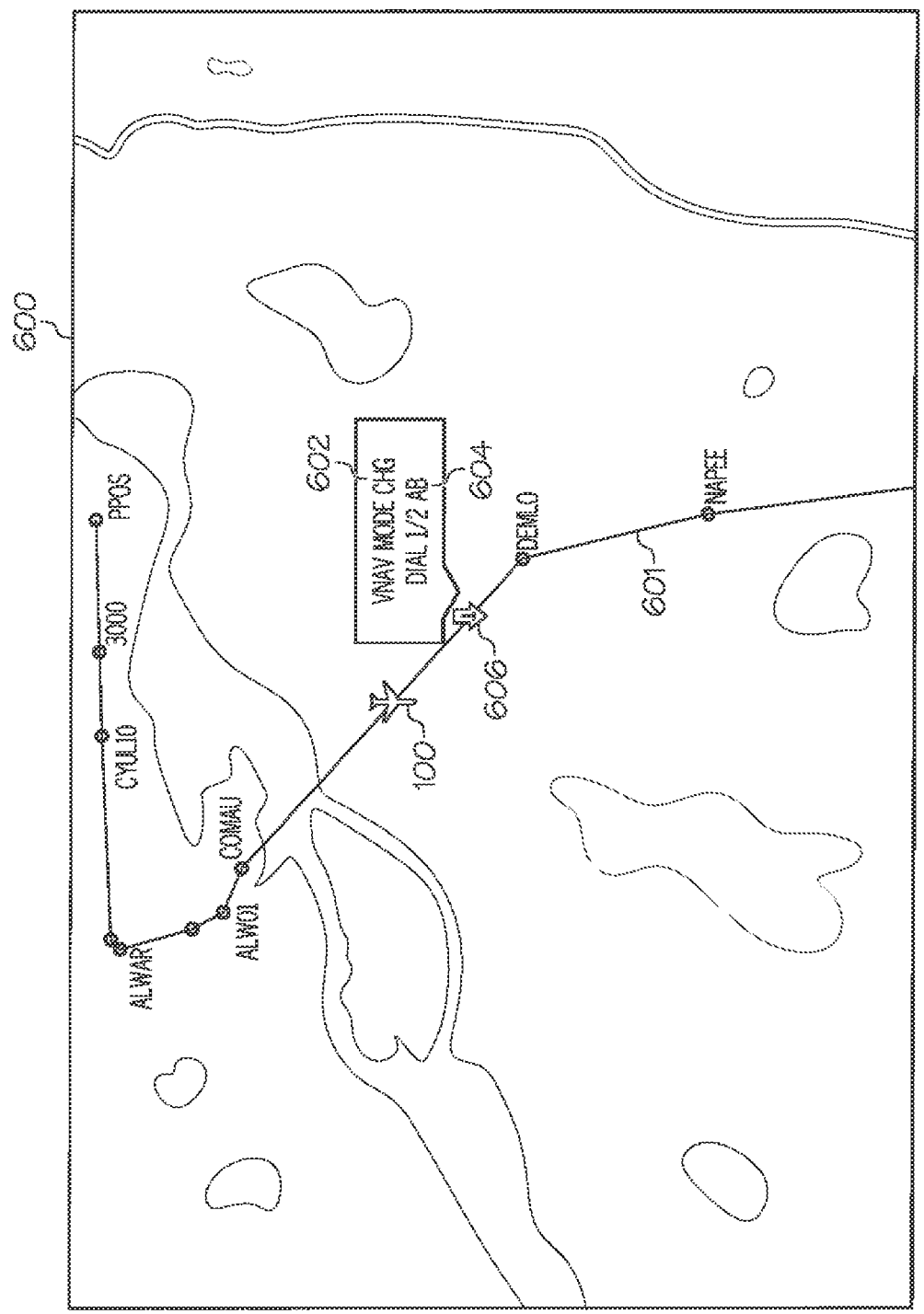
FIG. 6 is a top-down three-dimensional terrain map with an alert to a change in flight management system (FMS) vertical guidance mode (VNAV), in accordance with various exemplary embodiments.
Figure 7:
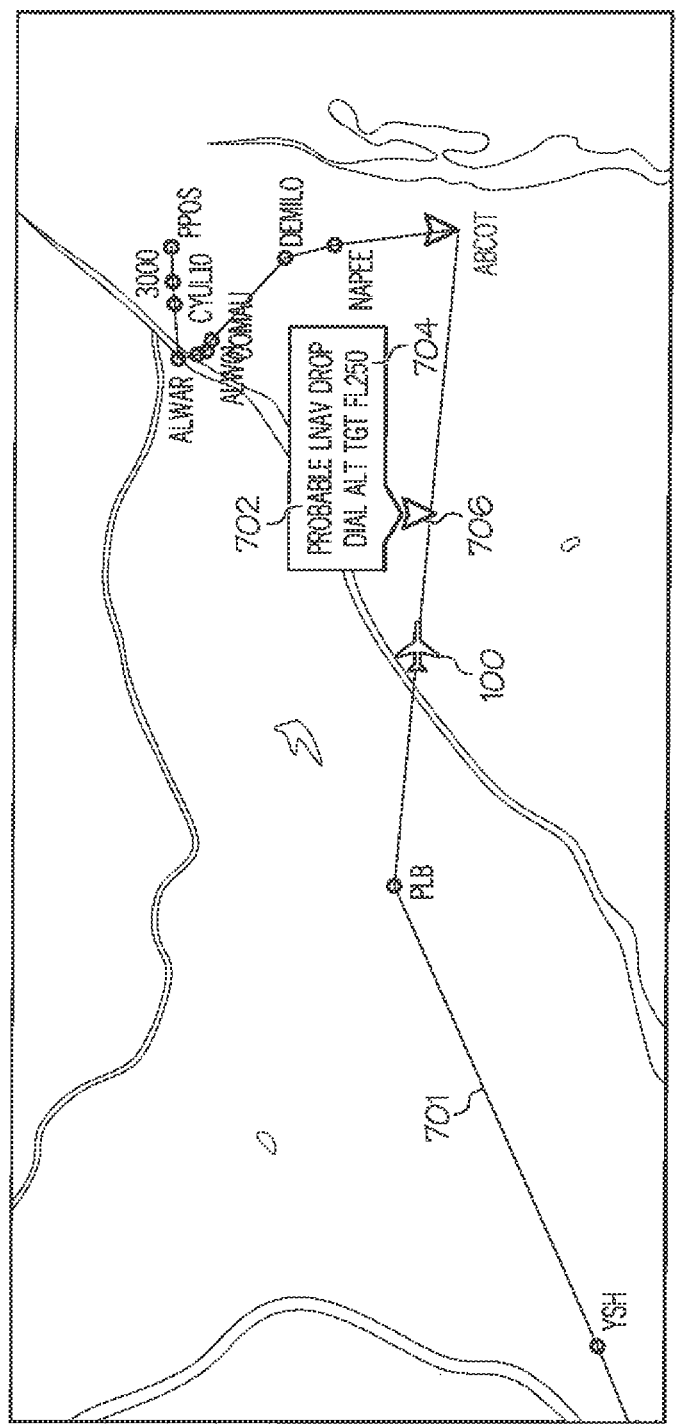
FIG. 7 is a top-down three-dimensional terrain map with an alert to a change in flight management system (FMS) lateral navigation (LNAV), in accordance with various exemplary embodiments.
Figure 8:
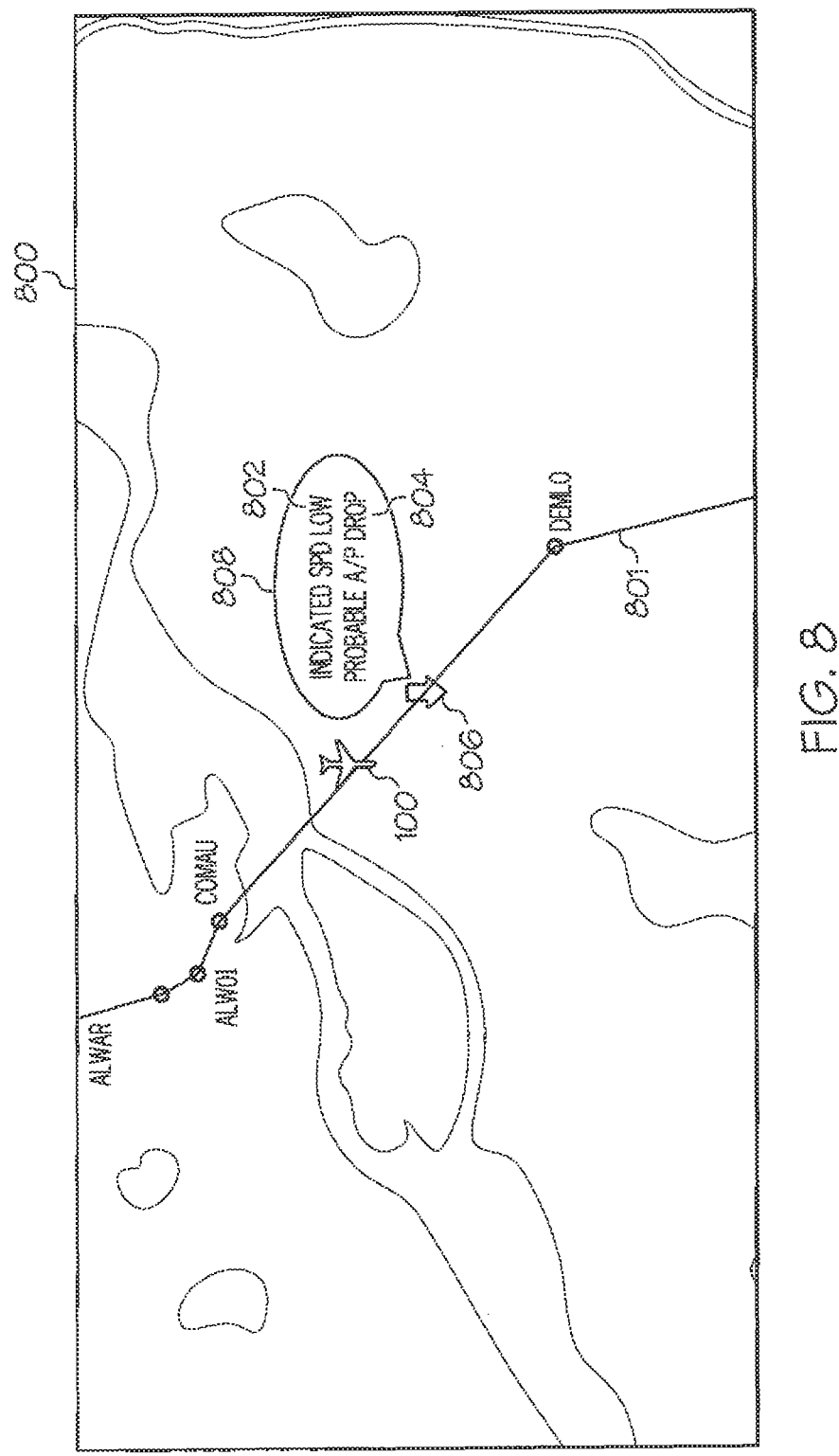
FIG. 8 is a top-down three-dimensional terrain map with an alert to autopilot disengagement, in accordance with various exemplary embodiments.

FIGS. 6-8 are top-down, three dimensional images illustrating additional cockpit level events, such as might be seen on a synthetic vision system. FIG. 6 is a top-down three-dimensional terrain image 600 with an alert to the event of a change in flight management system (FMS) vertical guidance mode (VNAV) 602. The FMS VNAV generally provides speed, pitch and altitude targets to autopilot for the vertical flight plan. The VNAV modes are mainly based on current aircraft altitude with respect to the predicted vertical path, and current aircraft speed with respect to the predicted vertical speed. In some scenarios, a change in VNAV mode may be instigated by external factors, such as wind or weather. The trend module 104 provides a technological solution to this scenario by providing information to the pilot about probable causes of this event, and corrective actions for this event. To do so, the trend module 104 continually processes actual aircraft altitude and speed with respect to predicted aircraft altitude and speed, thereby enabling a prediction as to a probable cause for an altitude deviation when a VNAV mode changes due to external conditions. As depicted in FIG. 6, the aircraft 100 is shown on a flight path 601. The predicted event VNAV mode change 602 is shown above a symbol 606 that anchors the predicted event to a time and space relevant position along the flight path 601. In scenarios such as the one depicted in FIG. 6, the rules in the trend program 162 may induce additional computations to determine whether the current actual altitude is above path, on path, or below path. In the same manner, the rules in the trend program 162 may induce additional data transformations to determine whether the current actual speed is above speed. After completing all of the data transformations indicted by the rules in the trend program 162, corrective action 604 is rendered below the predicted event 602.

FIG. 7 is a top-down three-dimensional terrain image 700 with an alert to an event called LNAV DROP 702, in accordance with various exemplary embodiments. FMS LNAV generally provides the roll steering command to an autopilot for a lateral flight plan. In doing so, the FMS constantly crosschecks the various sensors for aircraft altitude, position, speed data, etc. If a source of this information to the FMS is deemed inaccurate, a command to the autopilot may be ignored. This is referred to as a drop in FMS LNAV mode. The trend module 104 provides a technological solution to this scenario by providing information to the pilot about probable causes of this event, and corrective actions for this event. To do so, the trend module 104 continually processes actual aircraft altitude, position, and speed with respect to previous aircraft altitude and speed to determine any sudden deviation in critical parameters. A corrective action that may be displayed here is "DIAL ALT TARGET FL XXX." In the depicted embodiment, corrective action 704 is rendered below the predicted event PROBABLE LNAV DROP 702 to indicate that a sudden deviation is detected in sensed aircraft altitude data. Aircraft 100 is shown on a flight path 701. A symbol 706 anchors the predicted event 702 to a time and space relevant position along the flight path 701.

FIG. 8 is a top-down three-dimensional terrain image 800 with an alert to autopilot disengagement, in accordance with various exemplary embodiments. In the cockpit event that autopilot 132 disengages, a pilot is generally tasked with checking multiple cockpit displays for a clue as to the cause. In some scenarios, the cause is not a system failure at all, but rather a sensor failure, for example, when a pitot probe is iced over and cannot compute actual aircraft airspeed. In another example, lightening outside an aircraft 100 may cause a sudden rise in temperature inside. In each of these cockpit events, the autopilot may disengage. The trend module 104 provides a technological solution to this scenario by providing information to the pilot about probable causes of this event, and corrective actions for this event. In FIG. 8, the event "indicated SPD low" 802 is rendered above the probable cause autopilot A/P drop 804. This corrective action focuses a pilot's attention to check the speed of the aircraft 100. Aircraft 100 is shown on a flight path 801. A symbol 806 anchors the predicted event to a time and space relevant position along the flight path 801. As with the other figures, a border 808 may be rendered around the alphanumeric content comprising the event alert, the probable causes, and the corrective actions.

As is readily appreciated, the above examples of cockpit events are non-limiting, and many others may be addressed the trend module 104. Thus, a system and method capable of processing event information, determining authorized recipients for the event information, and selectively annunciating the event to the authorized recipients are provided.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims. It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 136 and containing computer instructions stored therein for causing a computer processor (such as the processor 150) to perform and execute the program 136. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

What is claimed is:

1. A system for trend monitoring in an aircraft, the system comprising:
    a memory device;
    a display device; and
    a processor coupled to the memory device, a source of critical parameters, and the display device, the processor configured to:
        initialize, for a critical parameter, a first threshold (t1) and a first alert table (a1), wherein a1 comprises, for t1, a list of probable causes associated with exceedance of t1, a respective list of corrective actions, and a communication protocol for the display device;
        receive, at a first time, for the critical parameter, a valid first actual data, and a valid first predicted data;
        determine a first current deviation defined as a difference between the first valid actual data and the first valid predicted data;
        assert a flag upon determining that first current deviation exceeds t1;
        determine a content and format for an alert based on the asserted flag and the critical parameter;
        identify a probable cause and corrective action associated with the alert in response to referencing a1; and
        command the display device to render the alert, probable cause, and the corrective action, in accordance with a1.

2. The system of claim 1, wherein the processor is further configured to:
    determine that a previous data location in memory comprises a previous actual data, a previous predicted data, a previous time, and a previous deviation;
    determine a delta time (delta_t) defined by the current time minus the previous time; and
    determine a delta deviation (delta_dev) defined by the current deviation minus the previous deviation.

3. The system of claim 2, wherein:
    the delta_dev is positive, and the delta_dev/delta_t is greater than t1, and
    wherein identifying a probable cause and corrective action associated with the alert in response to referencing a1 further comprises generate an above threshold alert including the probable cause and corrective action, in accordance with a1.

4. The system of claim 2, wherein:
    the delta_dev is negative, and the delta_dev/delta_t is greater than t2, and
    wherein identifying a probable cause and corrective action associated with the alert in response to referencing a1 further comprises generate a below threshold alert including the probable cause and corrective action, in accordance with a1.

5. The system of claim 2, wherein:
    wherein identifying a probable cause and corrective action associated with the alert in response to referencing a1 further comprises:
    if the delta_dev is positive, and if delta_dev/delta_t is greater than t1, generate an above threshold alert including the probable cause and corrective action, in accordance with a1; and
    if the delta_dev is negative, and if delta_dev/delta_t is greater than t2, generate a below threshold alert including the probable cause and corrective action, in accordance with a1.

6. The system of claim 5, wherein the parameter is altitude.

7. The system of claim 5, wherein the critical parameter is ground speed.

8. The system of claim 5, wherein each of the valid first actual data and the valid first predicted data are received from one of the set including a flight management system, an autopilot system, a data link communication system, an air traffic control (ATC) communication, a cockpit sensor, a source of weather information, and a global positioning system.

9. The system of claim 8, wherein the display device comprises a primary flight display.

10. The system of claim 8, wherein the display device comprises a lateral flight display.

11. The system of claim 8, wherein the display device comprises a vertical flight display.

12. A trend monitoring module for an aircraft, the module comprising:
a computer readable storage medium; and
a processor coupled to the storage medium, the processor configured to:
initialize, for a critical parameter, a first threshold (t1), a second threshold (t2), and a first alert table (a1), wherein a1 comprises, for t1 and t2, a list of probable causes associated with exceedance of t1 and respective corrective actions, and a list of probable causes associated with exceedance of t2 and respective corrective actions;
(a) receive from a source of critical parameters, at a first time, for the critical parameter, a valid first actual data, and a valid first predicted data;
(b) determine the first current deviation defined by the first valid actual data minus the first valid predicted data;
(c) transfer contents of a current data location to a previous data location in the storage medium, the previous data location comprising a previous actual data, a previous predicted data, a previous time, and a previous deviation;
(d) store, in the current data location, the first valid actual data, the first valid predicted data, the first time as current time, and the first current deviation; and
determine a delta time (delta_t) defined by the current time minus the previous time,
determine a delta deviation (delta_dev) defined by the current deviation minus the previous deviation,
if the delta_dev is positive, generate an above threshold alert, and if delta_dev/delta_t is greater than t1, generate an alert including a probable cause and corrective action, in accordance with a1,
if the delta_dev is negative, generate a below threshold alert, and if delta_dev/delta_t is greater than t2, generate an alert including a probable cause and corrective action, in accordance with a1; and
(e) repeat (a)-(d).

13. The module of claim 12, wherein the parameter is altitude or ground speed.

14. The module of claim 13, wherein each of the valid first actual data and the valid first predicted data are received from one of the set including a flight management system, an autopilot system, a data link communication system, an air traffic control (ATC) communication, a cockpit sensor, a source of weather information, and a global positioning system.

15. The module of claim 12, wherein a1 further comprises a communication protocol for a primary flight display, and the processor is further configured to command the primary flight display to render the alert in accordance with a1.

16. A method for trend monitoring in an aircraft, the method comprising:
initializing in a memory device, for a critical parameter, a first threshold (t1), and a first alert table (a1), wherein a1 comprises, for t1, a list of probable causes associated with exceedance of t1, a respective list of corrective actions, and a communication protocol for a display device;
receiving from a source of critical parameters, at a first time, for the critical parameter, a valid first actual data, and a valid first predicted data;
determining a first current deviation defined as a difference between the first actual data and the first predicted data;
asserting a flag upon determining that first current deviation exceeds t1;
referencing a1 to determine a content and format for an alert based on the asserted flag and the critical parameter; and
identifying a probable cause and corrective action associated with the alert in response to referencing a1.

17. The method of claim 16, further comprising:
commanding a display device to render the alert, probable cause, and the corrective action, in accordance with a1.

18. The method of claim 17, further comprising:
transferring contents of a current data location in the memory device to a previous data location in the memory device, respectively, wherein the previous data location comprises a previous actual data, a previous predicted data, a previous time, and a previous deviation;
storing, in the current data location, the first actual data, the first predicted data, the first time as current time, and the first current deviation;
determining a delta time (delta_t) defined by the current time minus the previous time; and
determining a delta deviation (delta_dev) defined by the current deviation minus the previous deviation.

19. The method of claim 18, wherein:
the delta_dev is positive, and the delta_dev/delta_t is greater than t1, and further comprising generating an above threshold alert including the probable cause and corrective action, in accordance with a1.

20. The method of claim 18, wherein:
the delta_dev is negative, and the delta_dev/delta_t is greater than t2, and further comprising generating a below threshold alert including the probable cause and corrective action, in accordance with a1.

* * * * *